Nov. 9, 1965  M. W. BEARDSLEY  3,216,518
CONTROL DEVICE FOR AIR CUSHION VEHICLES
Filed Nov. 7, 1961

INVENTOR
MELVILLE W. BEARDSLEY
BY A. Fred Starobin
ATTORNEY

United States Patent Office 3,216,518
Patented Nov. 9, 1965

3,216,518
CONTROL DEVICE FOR AIR CUSHION
VEHICLES
Melville W. Beardsley, Severna Park, Md., assignor, by mesne assignments, to A. Fred Starobin, Washington, D.C.
Filed Nov. 7, 1961, Ser. No. 150,695
9 Claims. (Cl. 180—7)

The present invention relates to air cushion vehicles, and has particular reference to an improved method and apparatus for controlling and steering the air cushion vehicles.

The outstanding advantage of the present invention lies in the fact that it now makes possible the accurate control of the movement and direction of travel of air cushion vehicles.

With the new arrangement it is possible to provide automatic adjustment of the air cushion vehicle control device in conformance with the changes in ground surface height.

The new invention is adaptable to all types of air cushion vehicles including both the flexible bottom or rigid bottom types of vehicles.

Basically, the present invention provides a novel and improved control for air cushion vehicles by maintaining a point of contact with the surface over which the vehicle is traveling whether it be land or water.

The present invention operates on the principle whereby the contact with the surface over which the vehicle is traveling is located behind the center of gravity of the vehicle. A lateral shifting of weight moving the center of gravity in a lateral direction causes a side turning force as the vehicle tends to drift sideward when banked about the roll axis, the side force being behind the center of gravity and causing the vehicle to turn toward the side of the vehicle which is lower so that the turn and bank are qualitatively coordinated.

These as well as further advantages which are inherent in the invention will become apparent from the following description, reference being had to the accompanying drawings, wherein.

Figure 1:
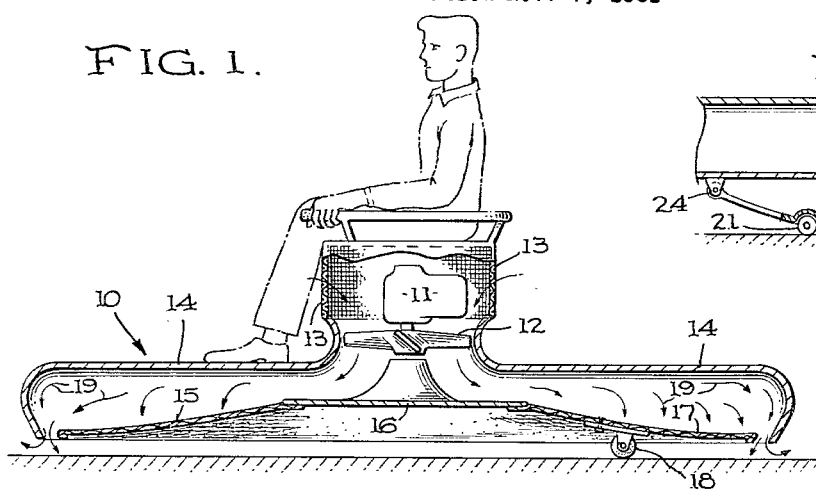
FIG. 1 is a partially sectioned view of an air cushion vehicle embodying the present invention.

Referring first to FIG. 1, there is illustrated an air cushion vehicle 10 having a gasoline engine 11 which rotates fan 12 thereby drawing air through the sides 13 of air cushion vehicle 10 into the body of the vehicle formed by outer shell 14 and flexible bottom 15. This type of air cushion vehicle having a flexible bottom has been described in my Patent Number 3,139,947, issued July 7, 1964, and entitled "Air Cushion Vehicle." The center section 16 on this type of vehicle is usually of rigid construction. Attached to the aft flexible section 17 is a wheel 18. The air flow in the vehicle, as designated by arrows 19, causes an expansion of the flexible bottom 15 in a direction away from outer shell 14. This motion of flexible bottom 15, which must necessarily be in a downward direction, causes wheel 18 to contact the ground surface over which air cushion vehicle 10 is traveling.

Figure 2:
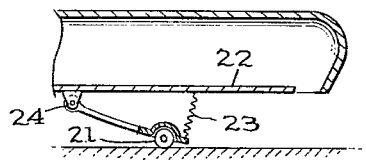
FIG. 2 is a detail view of a wheel contact used in a different embodiment of an air cushion vehicle.
Figure 3:
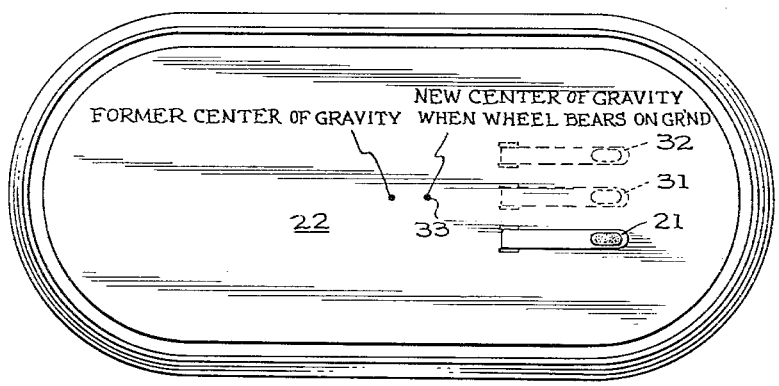
FIG. 3 is a bottom view of a rigid bottom type of air cushion vehicle illustrating some alternate locations of a wheel contacting device.

FIG. 2 shows a detailed view of a wheel 21 attached to a rigid bottom 22 of an air cushion vehicle. This type of wheel contains the additional parts, such as spring 23, which causes wheel 21 to swivel at joint 24 and maintain contact with the ground surface over which the air cushion vehicle is traveling. When the wheel contact device is used with the flexible bottom air cushion vehicle, shown in FIG. 1, the work of spring 23 and swivel joint 24 of the wheel shown in FIG. 2 is all accomplished by flexible bottom 15. Whether the wheel structure shown in FIG. 1 or that shown in FIG. 2 is used, it is important that the location of the wheel is behind the center of gravity of the air cushion vehicle upon which it is installed. The wheel 31, 21 or 32 may be located at any point behind the center of gravity either along the longitudinal center of the vehicle or toward the port or starboard sides of the vehicle, respectively. These alternate locations of the wheel contacting device 21, 31 or 32 are shown in the bottom view of an air cushion vehicle illustrated in FIG. 3, which also illustrates the new center of gravity 33 created when the wheel contacting device bears on the ground during a turning operation. This change of position must be considered so that the position of the ground contact device is behind the center of gravity at point 33.

Figure 4:
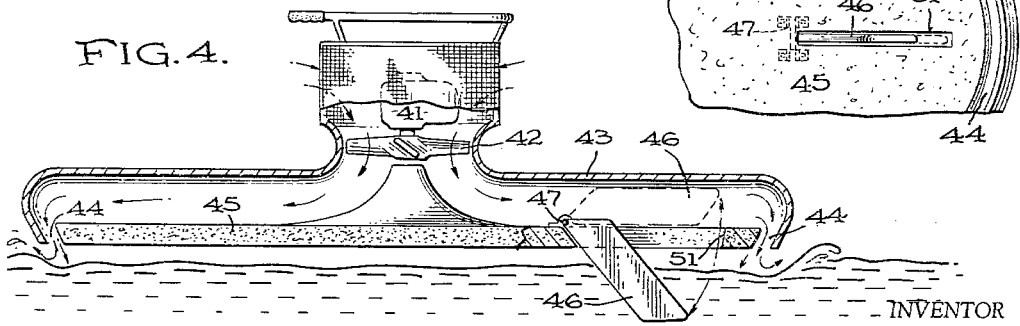
FIG. 4 is a sectioned view of a primarily water traversing air cushion vehicle using a different embodiment of the present invention.

Since air cushion vehicles by their inherent principles may travel over different types of surfaces, whether they be land or water, an additional embodiment of the present invention is shown in FIG. 4. In this figure there has been illustrated an air cushion vehicle constructed primarily for travel over a water surface. Here the vehicle is shown to have an engine 41 which causes fan 42 to rotate and force air into outer shell 43 and out through the peripheral jets 44. In this case an air cushion vehicle having a rigid bottom 45 composed of a buoyancy material to support the vehicle when it rests on water with the engines off is illustrated. For more efficient surface contact a steering keel 46 is used. This keel 46 is made to swivel at joint 47 so that it may be free to deflect upward as the same vehicle approaches and travels over a hard ground surface. The keel 46 may be constructed to lower itself either due to its own weight, as shown in FIG. 4, or by a compressible spring arrangement, which is not shown but which would incorporate the same principle of construction used with the wheel illustrated in FIG. 2.

Figure 5:
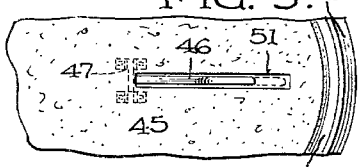
FIG. 5 is a partial view of the bottom of the vehicle shown in FIG. 4.

FIG. 5 shows a bottom view of the keel arrangement shown in FIG. 4. A slot 51 in the rigid bottom 45 allows complete withdrawal of steering keel 46 into the body of the air cushion vehicle for times when this air cushion vehicle will be resting on a hard surface.

Through the use of apparatus of the type illustrated in the above embodiments of the invention controlling and steering of an air cushion vehicle may be affected. Through the shifting of the center of gravity of the air cushion vehicle in a lateral direction by means of the operator shifting his position or by other means of shifting weight in a lateral direction in the vehicle such as by the movement and repositioning of a weight laterally in the vehicle, the vehicle has a tendency to move in the lateral direction in which the center of gravity has been moved. This is due to the inherent characteristics of air cushion vehicles. When an air cushion vehicle is caused to slope downward in any direction, it will have a tendency to travel in that direction as if it were traveling down a slope caused by the contour of the surface over which it is traveling. The device of the present invention, whether it be a wheel, a skid, a keel, or any other means of making contact with the surface over which the air cushion vehicle is traveling, by exerting a force which restricts the lateral movement of the vehicle and by acting as a fulcrum point converts the lateral movement into a rotational movement thus allowing the steering of the air cushion vehicle by a very simple and effective means.

Although the embodiments shown have illustrated the use of a wheel in the case of an air cushion vehicle traveling over a land surface and the use of a keel in an air cushion vehicle traveling over a water surface, the invention is not to be limited by these structures. Any device attached to the bottom of an air cushion vehicle which will maintain contact with whatever surface the air cushion vehicle is traveling above will immensely improve the control of the air cushion vehicle in conformance with the principles of the present invention. It should, therefore, be understood that the specific apparatus herein illustrated and described is intended to be representative only, as many changes may be made therein without departing from the clear teachings of the invention. Accordingly, reference should be made to the following claims in determining the full scope of the invention.

What is claimed is:

1. An air cushion vehicle with means to control the direction of movement of the vehicle over a surface comprising a body shell forming a plenum chamber, bottom structure of the plenum chamber spaced around its periphery from said body shell, means to force air into said body shell and out around the periphery of said bottom structure, means for shifting the center of gravity of the vehicle laterally, and fulcrum means secured to said vehicle and in contact with said surface behind the center of gravity of the vehicle for restricting the lateral translation of the vehicle, whereby a shifting of the center of gravity of the vehicle in a lateral direction creates a force in conjunction with said fulcrum means for restricting the lateral translation which converts the translation into rotation.

2. The air cushion vehicle in accordance with claim 1 in which said fulcrum means for restricting the lateral translation of the vehicle comprises a wheel mounted behind the center of gravity in a position to contact the surface.

3. The air cushion vehicle in accordance with claim 1 in which said fulcrum means for restricting the lateral translation of the vehicle comprises a wheel mounted behind the center of gravity, and a spring means to maintain said wheel in contact with the surface for all heights of the air cushion vehicle above the surface.

4. The air cushion vehicle in accordance with claim 1 in which said fulcrum means for restricting the lateral translation of the vehicle comprises a keel mounted behind the center of gravity in a position to contact the surface.

5. The air cushion vehicle in accordance with claim 1 in which said bottom structure has a flexible bottom section, and said fulcrum means is attached to said flexible bottom section whereby air forced into said body shell expands said flexible bottom section in a downward direction to place said fulcrum means in contact with the surface.

6. The air cushion vehicle in accordance with claim 1 in which said fulcrum means for restricting the lateral translation of the vehicle comprises a pivotly mounted keel behind the center of gravity in a position to contact the surface.

7. The air cushion vehicle in accordance with claim 6 in which said bottom structure has a slot therethrough and is made of a buoyant material that will allow flotation of the vehicle on the surface when the surface is water, and said pivotly mounted keel attached to said bottom structure and located so as to pass through the slot in said bottom structure.

8. An air cushion vehicle with means to control the direction of movement of the vehicle over a surface comprising a body shell forming a plenum chamber, means to force air into said body shell, means for shifting the center of gravity of the vehicle laterally, a wheel means within the periphery and extending below the periphery of said plenum chamber in contact with said surface behind the center of gravity of the vehicle for restricting the lateral translation of the vehicle whereby a shifting of the center of gravity of the vehicle in a lateral direction creates a force in conjunction with said wheel means for restricting the lateral translation which converts the translation into rotation.

9. An air cushion vehicle with means to control the direction of movement of the vehicle over a surface comprising a body shell forming a plenum chamber, means to force air into said body shell, means for shifting the center of gravity of the vehicle laterally, a keel means within the periphery and extending below the periphery of said plenum chamber in contact with said surface behind the center of gravity of the vehicle for restricting the lateral translation of the vehicle whereby a shifting of the center of gravity of the vehicle in a lateral direction creates a force in conjunction with said keel means for restricting the lateral translation which converts the translation into rotation.

References Cited by the Examiner

UNITED STATES PATENTS

| 936,395 | 10/09 | Worthington | 180—7 |
| 2,603,301 | 7/52 | Sipior et al. | 180—7 |
| 2,953,321 | 9/60 | Robertson et al. | 180—7 |
| 3,039,550 | 6/62 | Beardsley | 180—7 |

FOREIGN PATENTS

| 385,964 | 4/08 | France. |
| 1,238,499 | 7/60 | France. |

OTHER REFERENCES

Publication: "Science and Mechanics"; June 1960; pages 73–77.

A. HARRY LEVY, *Primary Examiner.*